(No Model.)
C. DEIS.
EGG AND SUGAR BEATER.
No. 254,540. Patented Mar. 7, 1882.
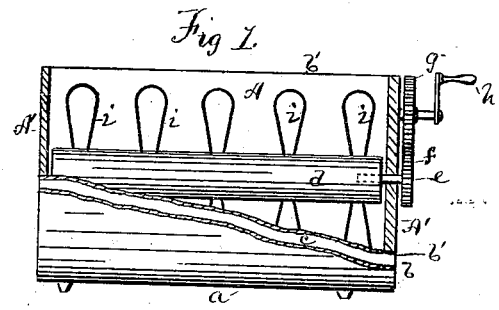
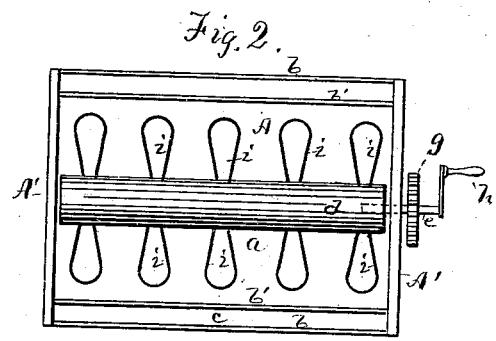
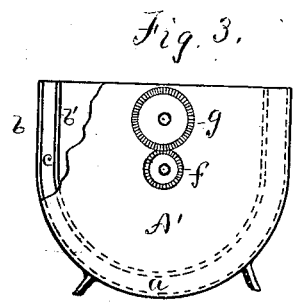
WITNESSES:
Charles Deis
INVENTOR
BY J. R. Drake
ATTORNEY

UNITED STATES PATENT OFFICE.

CHARLES DEIS, OF BUFFALO, NEW YORK.

EGG AND SUGAR BEATER.

SPECIFICATION forming part of Letters Patent No. 254,540, dated March 7, 1882.

Application filed January 13, 1882. (No model.)

*To all whom it may concern:*

Be it known that I, CHARLES DEIS, a citizen of the United States, residing at Buffalo, in the county of Erie and State of New York, have made certain Improvements in Egg and Sugar Beaters, of which the following is a specification.

This invention is intended for the use of bakeries, where large quantities of eggs and sugar and flour are beaten for cake-making, &c., the object being to supply a cheap and simple machine that will do the work in a much shorter time than by hand-beating, as generally practiced; and the invention consists in the employment of an open box or receptacle with a rounded bottom, and having hollow (tin) or double side walls to contain hot water therein, to aid the beating by warming the egg mass in the box, so that it works quicker, and combined with a revolving shaft having a series of projecting whips or dashers thereon, which is operated by gear-wheels and a crank outside the end of said box, all substantially as hereinafter fully explained.

In the drawings, Figure 1 is a side elevation, partly in section; Fig. 2, a top plan, and Fig. 3 an end view.

A represents a box or open-topped receptacle, having wooden (solid) ends A' A', and a rounded bottom, $a$, to the whole. The sides and bottom are composed of two walls, (preferably of tin,) $b\ b'$, leaving an open space, $c$, between, into which is poured hot water. The outer wall, $b$, is in the nature of a jacket to the sides. This completes the construction of the box.

The beater consists of a shaft, $d$, one end running in a bearing in one end of the box, the other or operating end projecting through the other end A' of the box, or provided with a journal, $e$, that sets into said shaft $d$, and is removable therefrom for the purpose of taking out the beater to dip or pour out the contents of the box, the rounded bottom greatly aiding this object by not presenting any corners or sharp angles into which the stuff could stick, and allowing it to be easily cleaned out. On one end of the journal $e$, outside the box, is a cog-wheel, $f$, which meshes into another wheel, $g$, and which is operated by a crank, $h$, and thus rotates the horizontal shaft $d$. On this shaft are set a number of projecting whips or beaters, $i\ i\ i\ i$, of wire, either in bunches or singly, and in rows or alternately in position, which, when rapidly revolved by the crank, beat up the mass of eggs or eggs and sugar and flour in a very short time to the required lightness and consistency, giving the same effect as rapid hand-beating.

The end walls, A' A', may also be double, either or both, if desired; but I prefer only the side walls and bottom double, and made of tin, through which the heat of the water quickly goes. A plug will stop an opening in the bottom or side to let out the hot water, and an opening at the top of the sides will be used to pour in the hot water. A cover or top for the whole may be used. It is equally available for family or bakers' use.

I claim—

In a baker's egg and sugar beater, the combination of the shaft $d$, having the wire whips $i\ i\ i$ thereon operated by cog-wheels $f\ g$ and crank $h$, with the box A A' A', having the rounded bottom $a$ and double walls $b\ b'$, (and bottom,) all arranged and operating substantially as specified.

In witness whereof I have hereunto signed my name in the presence of two subscribing witnesses.

CHAS. DEIS.

Witnesses:
 J. R. DRAKE,
 C. H. KELLOGG.